United States Patent
Shoptaw et al.

(10) Patent No.: US 6,715,457 B1
(45) Date of Patent: Apr. 6, 2004

(54) PISTON ASSEMBLY

(75) Inventors: Christopher Todd Shoptaw, Granger, IN (US); Ralph Edwin Fain, South Bend, IN (US)

(73) Assignee: Federal-Mogul World Wide, Inc., Southfield, MI (US)

(*) Notice: Subject to any disclaimer, the term of this patent is extended or adjusted under 35 U.S.C. 154(b) by 0 days.

(21) Appl. No.: 10/393,481

(22) Filed: Mar. 20, 2003

(51) Int. Cl.[7] ................................. F01P 1/04
(52) U.S. Cl. ...................... 123/193.6; 92/216
(58) Field of Search .............. 123/193.6; 92/187–261

(56) References Cited

U.S. PATENT DOCUMENTS

| | | |
|---|---|---|
| 1,017,498 A | 2/1912 | Bittner |
| 1,387,538 A | 8/1921 | Gulick |
| 1,711,425 A | 4/1929 | Pratt |
| 1,745,860 A | 2/1930 | Noble |
| 1,795,353 A | 3/1931 | Taylor et al. |
| 2,009,303 A | 7/1935 | Tanner et al. |
| 2,040,293 A | 5/1936 | Chandler |
| 2,056,302 A | 10/1936 | Smallwood et al. |
| 2,964,364 A | 12/1960 | Morgan |
| 4,073,220 A | 2/1978 | Guenther |
| 4,358,881 A * | 11/1982 | Mahrus et al. ......... 29/888.042 |
| 4,577,595 A * | 3/1986 | Deutschmann et al. .. 123/41.35 |
| 4,727,795 A | 3/1988 | Murray et al. |
| 4,843,952 A | 7/1989 | Ripberger |
| 5,144,884 A | 9/1992 | Kelly |
| 5,653,204 A * | 8/1997 | Shaffer .................... 123/193.6 |
| 5,839,352 A * | 11/1998 | Ribeiro et al. ................. 92/186 |
| 6,244,161 B1 * | 6/2001 | Myers et al. .................. 92/224 |
| 6,318,243 B1 | 11/2001 | Jones |
| 6,502,539 B2 | 1/2003 | Ribeiro et al. |

* cited by examiner

Primary Examiner—Marguerite McMahon
(74) Attorney, Agent, or Firm—Howard & Howard

(57) ABSTRACT

A piston assembly for an internal combustion engine comprises a piston body having a head and a pair of pin bosses depending from the head having a pair of pin bores aligned along a pin bore axis. A piston skirt has a pair of opposed skirt portions and a pair of opposed side wall portions joining the skirt portions. At least one skirt retainer is supported on at least one of the side walls. The skirt retainer is biased axially inwardly along the pin bore axis in register with a corresponding one of the pin bores to connect the piston skirt to the pin bosses. The skirt connects with a snap-fit to the piston body.

15 Claims, 2 Drawing Sheets

PISTON ASSEMBLY

BACKGROUND OF THE INVENTION

1. Technical Field

This invention relates generally to piston assemblies for use in small engine or automotive engine applications, and more particularly to the construction and method of attachment of a skirt to the piston assembly.

2. Related Art

Articulated pistons for small engine and/or automotive applications have the skirt formed separately from the crown and joined in articulated manner through the wrist pin. The crown has an upper ring belt portion in which a plurality of ring grooves are cut for accommodating rings of the piston. A pair of pin boss portions depend from the upper ring belt portion and are formed with an aligned pin bore for receiving a wrist pin to connect a wrist pin to a connecting rod. The crown of the piston is usually fabricated of steel. The articulated skirt of the piston is often fabricated of aluminum. The skirt is formed with a set of pin bores which align with the pin bores of the pin bosses to receive the wrist pin for connecting the skirt to the crown. Typically, the pin bores in the skirt have a circumferential groove formed therein for receiving a spring clip to retain the pin within the pin bores of the skirt and the pin bores of the pin bosses. In this way, the skirt is connected to the crown through the wrist pin such that the skirt is able to pivot slightly relative to the crown about the axis of the wrist pin and bores.

SUMMARY OF THE INVENTION

According to one construction of the invention, a piston assembly for an internal combustion engine comprises a piston body having a head and a pair of pin bosses depending from the head having a pair of pin bores aligned along a pin bore axis. The assembly further comprises a piston skirt having a pair of opposed skirt portions and a pair of opposed side wall portions joining the skirt portions. At least one skirt retainer is supported on at least one of the side walls, wherein the skirt retainer is biased axially inwardly along the pin bore axis in register with a corresponding one of the pin bores to connect the piston skirt to the pin bosses.

Another aspect of the invention provides a method of attaching a piston skirt in a piston assembly for an internal combustion engine. The method comprises the steps of providing a piston body having a pair of pin bosses depending from the end with a pair of pin bores aligned along a pin bore axis, and providing a piston skirt having a pair of opposed skirt portions and a pair of opposed side wall portions joining the skirt portions with at least one skirt retainer supported on one of the side walls. The piston skirt is attached to the pin bosses by guiding the skirt over free ends of the pin bosses and causing the skirt retainer to deflect outwardly and inwardly into register with the pin bores as the skirt snaps into position.

The invention has an advantage of decreasing the number of component parts required for assembly of a piston skirt within a piston assembly.

The invention has a further advantage of reducing both the associated costs in manufacturing the piston skirt, and also in reducing the total component costs of the piston assembly.

A further advantage is offered by improving the efficiencies in assembly of the piston assembly, and thus has an associated advantage of reducing the total assembly costs of the piston assembly.

Another advantage of the invention is that the piston skirt can be mounted on the piston body by simply pushing the skirt into engagement with the piston body.

Another advantage of the invention is that it is of relatively simple design and applicable to a wide range of internal combustion engine sizes and applications.

THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
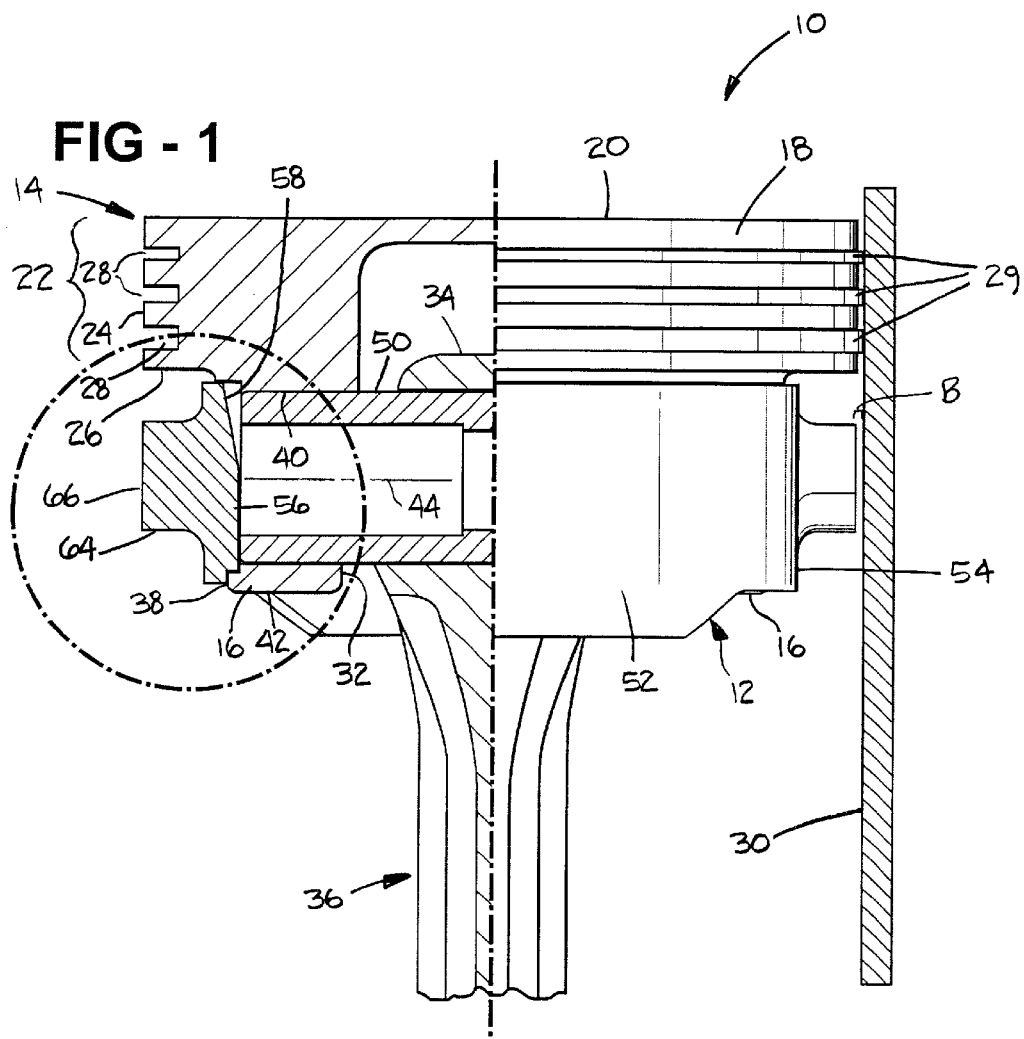
FIG. 1 is a quarter cross-sectioned side view of a piston assembly embodying one presently preferred construction of the invention.

A piston assembly constructed according to one embodiment of the invention for use in an internal combustion engine is indicated generally at 10 in FIG. 1. The piston assembly 10 has a piston skirt 12 and a piston body 14 having a pair of pin bosses 16. The piston skirt 12 is constructed for snap-on attachment to the pin bosses 16.

The piston body 14 has a head portion 18 fabricated preferably of steel and is constructed as a single piece or of multiple pieces which may be joined in any number of known manners, such as by bolting, brazing, screwing, welding, etc. The head portion 18 has an upper surface 20 and a circumferentially extending ring belt portion 22 having a cylindrical outer surface 24 extending longitudinally between the upper surface 20 and a lower end 26 of the head portion 18. The ring belt portion 22 is formed with a plurality of circumferentially continuous grooves 28 for accommodating a plurality of rings 29 to facilitate reciprocating movement within a cylinder bore 30 of the internal combustion engine.

The pin bosses 16 have inner surfaces 32 spaced laterally from one another for receiving a small end 34 of a connecting rod 36 and outer surfaces 38 which are spaced laterally inwardly of the outer surface 24 of the ring belt portion 22. A pair of pin bores 40 are formed adjacent free ends 42 of the pin bosses and are aligned along a pin bore axis 44. The outer surfaces 38 of the pin bosses 16 preferably have a recessed surface 46 extending around the perimeter of the pin bores 40. The recessed surfaces 46 form counterbores 48 extending axially inwardly a first distance (A) from the outer surface 38 generally along the pin bore axis 44. The pin bores 40 are sized to receive a wrist pin 50, preferably with a journaled fit, for rotation of the wrist pin 50 within the pin bores 40 throughout reciprocation of the piston assembly 10 in the cylinder bore 30. The wrist pin 50 is preferably sized in length to extend between the recessed surfaces 46 of each counterbore 48 and to allow for at least some movement of the wrist pin 50 along the pin bore axis 44 in use.

Figure 2:
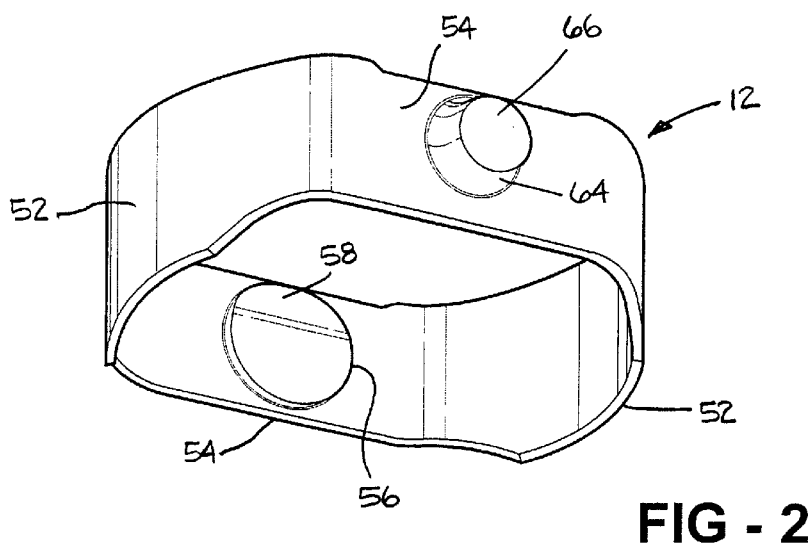
FIG. 2 is a perspective view of a piston skirt of FIG. 1.
Figure 5:
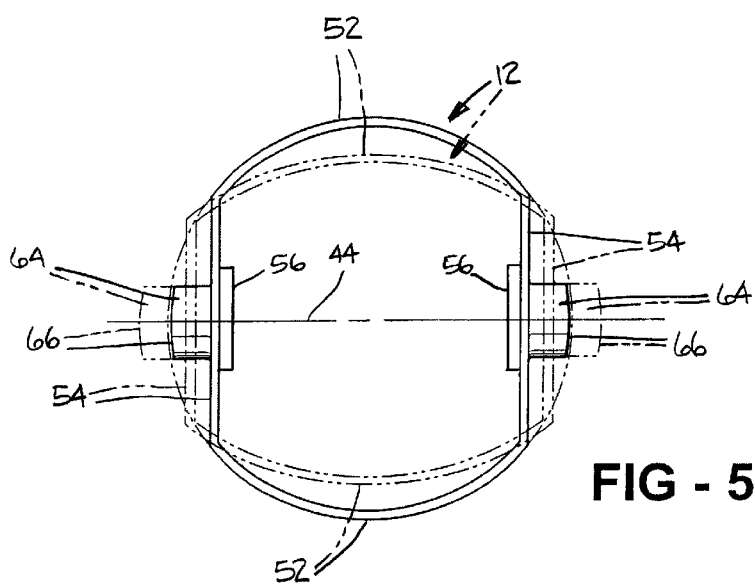
FIG. 5 is a top view of the piston skirt of FIG. 1 showing the piston skirt in a partially assembled state in phantom line, and in a fully assembled state in solid line.

As best shown in FIGS. 2 and 5, the piston skirt 12 has a pair of opposed skirt portions 52 and a pair of opposed side wall portions 54 joining the skirt portions 52 in preferably a circumferentially continuous construction. The piston skirt 12 is constructed from an elastically deformable material, preferably metal or plastic to enable the skirt 12 to flex for mounting on the piston body 14 as will be described below.

Figure 3:
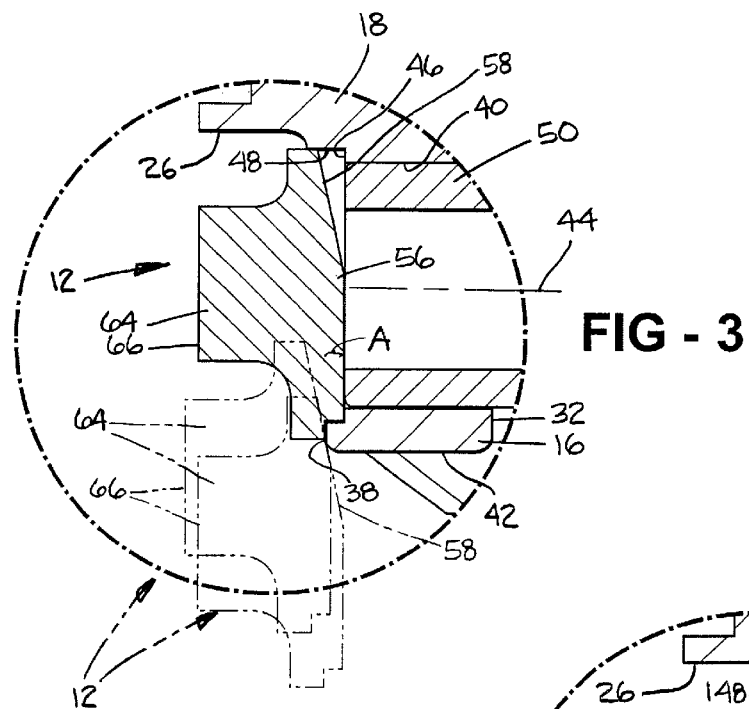
FIG. 3 is an enlarged fragmentary cross-sectioned view of the piston skirt shown partially assembled to a pin boss in phantom line and fully assembled to the pin boss in solid line.

The piston skirt 12 has at least one skirt retainer 56 supported on at least one of the side wall portions 54, and as shown here preferably a pair of such skirt retainers 56 supported on the side wall portions 54. As best shown in FIG. 3, the skirt retainers 56 have upper cam surfaces 58 arranged for camming engagement with the corresponding pin bosses 16 during attachment of the piston skirt 12 to the piston body 14. The skirt 12 is attached to the piston body 14 by guiding the face ends of the pin bosses 16 through the open upper end of the skirt 12. The upper cam surfaces 58 engage the pin bosses 16 and act to deflect at least one of the skirt retainers 56 outwardly, and thus at least a portion of at least one of the side wall portions 54 axially outwardly and generally along the pin bore axis 44 (FIGS. 3 and 5). In addition, at least one of the skirt portions 52 preferably deflects elastically inwardly in response to advancement of the camming engagement of the upper cam surfaces 58 with the corresponding pin bosses 16 (see phantom lines of FIG. 5). When the skirt retainers 56 are guided into registry with the corresponding pin bores 40, they return inwardly to their substantially pre-deflected position under the bias return of the recoverying skirt 14, causing the retainers 56 to drop into retained engagement with the pin bores 40. The skirt retainers 56 preferably extend into the counterbores 48 of the pin bores 40 substantially the first distance (A) to attach the piston skirt to the piston body and to maintain the wrist pin 50 within the pin bores 40.

Figure 4:
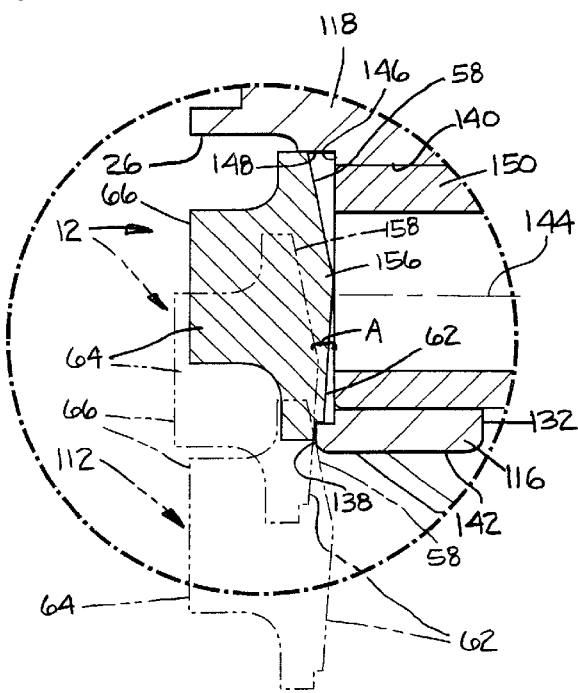
FIG. 4 is a view similar to FIG. 3 showing construction of the piston skirt of FIG. 1.

As best shown in FIG. 4, an alternate construction of the piston skirt 12 is shown, wherein like features are given like reference numerals, but are offset by 100. The piston skirt 112 is shown having skirt retainers 156 with a generally dual tapered surface providing an upper cam surface 158 and a lower cam surface 62. The upper cam surface 158 functions the same as that of the upper cam surface 58 described above in connection with the previous embodiment. The lower cam surface 62 is arranged for camming engagement with the corresponding pin boss 116 to facilitate deflecting the skirt retainer 156 axially outwardly and generally along the pin bore axis 144 to facilitate selective removal of the piston skirt 112 from the piston body 114, if desired. For the skirt retainers 156 to deflect outwardly by an amount sufficient to remove the piston skirt 112 from the piston body 114, the piston assembly 110 must be removed from the cylinder bore 30. It should be recognized that the skirt retainers 56, 156 may be formed having other geometries than those shown here, and that the embodiments shown represent only the presently preferred embodiments of the invention.

The piston skirt 12 preferably has at least one retainer boss and shown here as a pair of retainer bosses 64 supported on the opposed side wall portions 54. The retainer bosses 64 have an outer surface 66 preferably formed with an arcuate shape substantially the same as the curvature of the cylinder bore 30. The retainer bosses 64 extend axially outwardly and substantially opposite the skirt retainers 56. Upon insertion of the piston assembly 10 within the cylinder bore 30, the outer surfaces 66 of the retainer bosses 56 are spaced a distance, represented here as a second distance (B), from the cylinder bore 30 (FIG. 1). The second distance (B) is less than the first distance (A) defined by the counterbores 48 within the pin bores 40, and thus the retainer bosses 64 prevent inadvertent removal of the skirt retainers 56 from the pin bores 40 while the piston assembly 10 is reciprocating within the cylinder bore 30. This results due to an insufficient clearance between the skirt retainers 56 and the pin bosses 16 to allow for removal of the retainers 56 from the pin bores 40. Therefore, to remove the piston skirt 12 from the pin bosses 16, the piston assembly 10 must be removed from the cylinder bore 30 to provide clearance for the removal of the retainer bosses 64 from the counterbores 48 of the pin bores 40.

Another aspect of the invention provides a method for assembly of the piston skirt 12 in the piston assembly 10. The method comprises providing the piston body 14 having the head portion 18 and the pin bosses 16 depending from the head portion 18 with the pin bores 40 aligned along the pin bore axis 44. A further step calls for providing the piston skirt 12 having the opposed skirt portions 52 and the opposed side wall portions 54, with the skirt portions 52 having at least one skirt retainer 56 supported on one of the side wall portions 54. Another step provides attaching the piston skirt 12 to the pin bosses 16 by deflecting at least one skirt retainer 56 and registering the skirt retainer 56 with a corresponding one of the pin bores 40. At least one of the skirt retainers 56 returns at least in part to its non-deflected position inwardly along the pin bore axis 44 for engaging the skirt retainer 56 with the corresponding pin bore 40.

Obviously, many modifications and variations of the present invention are possible in light of the above teachings. It is, therefore, to be understood that within the scope of the appended claims, the invention may be practiced otherwise than as specifically described. The invention is defined by the claims.

We claim:

1. A piston assembly for an internal combustion engine, comprising:
   a piston body having a head and a pair of pin bosses depending from said head having a pair of pin bores aligned along a pin bore axis;
   a piston skirt having a pair of opposed skirt portions and a pair of opposed side wall portions joining said skirt portions; and
   at least one skirt retainer supported on at least one of said side walls and biased axially inwardly along said pin bore axis in register with a corresponding one of said pin bores to connect said piston skirt to said pin bosses.

2. The piston assembly of claim 1 wherein said at least one skirt retainer has an upper cam surface arranged for camming engagement with said corresponding one of said pin bosses during attachment of said piston skirt to said piston body to facilitate deflecting at least a portion of said at least one skirt retainer axially outwardly generally along said pin bore axis until registered with said corresponding one of said pin bores wherein said at least one skirt retainer returns under said bias to its generally non-deflected position.

3. The piston assembly of claim 2 wherein said at least one skirt retainer has a lower cam surface arranged for camming engagement with said corresponding one of said pin bosses to facilitate deflecting said at least one skirt retainer axially outwardly generally along said pin bore axis during removal of said piston skirt from said piston body.

4. The piston assembly of claim 1 wherein said piston skirt and said skirt retainer are constructed as a single piece of elastically deformable material.

5. The piston assembly of claim 4 wherein said elastically deformable material is metallic.

6. The piston assembly of claim 4 wherein said elastically deformable material is plastics.

7. The piston assembly of claim 4 wherein said elastically deformable material is circumferentially continuous.

8. The piston assembly of claim 1 wherein said piston skirt has at least one retainer boss supported on at least one of said side wall portions extending axially outwardly and substantially opposite from said at least one skirt retainer inhibiting axially outward deflection of said at least one skirt retainer from said corresponding one of said pin bores while assembled in the engine.

9. The piston assembly of claim 8 wherein said at least one skirt retainer extends into said corresponding one of said pin bores a first distance and said at least one retainer boss has an outer surface spaced a second distance from a cylinder bore upon assembly into the engine wherein said first distance is greater than said second distance.

10. The piston assembly of claim 2 wherein at least one of said side wall portions deflects elastically outwardly in response to said camming engagement of said upper cam surface with said corresponding one of said pin bosses.

11. The piston assembly of claim 10 wherein said at least one of said side wall portions returns substantially to its non-deflected position upon registering said at least one skirt retainer with said corresponding one of said pin bores.

12. The piston assembly of claim 2 wherein at least one of said skirt portions deflects elastically inwardly in response to said camming engagement of said upper cam surface with said corresponding one of said pin bosses.

13. The piston assembly of claim 12 wherein said at least one of said skirt portions returns substantially to its non-deflected position upon registering said at least one skirt retainer with said corresponding one of said pin bores.

14. A method of attaching a piston skirt in a piston assembly for an internal combustion engine, comprising the steps of:

providing a piston body having a head and a pair of pin bosses depending from the head to free ends thereof and formed with a pair of pin bores aligned along a pin bore axis;

providing a piston skirt having a pair of opposed skirt portions and a pair of opposed side wall portions joining the skirt portions with at feast one skirt retainer supported on at least one of the side walls, the skirt having an open upper end;

attaching the piston skirt to the pin bosses by guiding the open end of the skirt over the free end of the pin bosses and toward the head, and thereby causing the at least one skirt retainer to deflect elastically outwardly and then return elastically inwardly in registry with at least one of the pin bores.

15. The method of claim 14 including forming the skirt retainer as one piece with the piston skirt of the same material.

* * * * *